United States Patent [19]
Teichert et al.

[11] Patent Number: 6,000,516
[45] Date of Patent: Dec. 14, 1999

[54] MOTOR VEHICLE AN HYDRAULIC CYLINDER, SUCH AS TO ACTUATE A CLUTCH, HAVING A QUICK FASTENER FOR MOUNTING THE HYDRAULIC CYLINDER TO A HOUSING

[75] Inventors: Ulrich Teichert, Rochester Hills; Manfred Mischler, Troy, both of Mich.

[73] Assignee: Mannesmann Sachs AG, Schweinfurt, Germany

[21] Appl. No.: 09/025,574

[22] Filed: Feb. 18, 1998

[30] Foreign Application Priority Data

Mar. 14, 1997 [DE] Germany .......................... 197 10 631

[51] Int. Cl.[6] ..................................................... F15B 15/20
[52] U.S. Cl. ................. 192/85 R; 248/27.3; 248/222.51; 92/128; 92/161; 403/329; 192/115
[58] Field of Search ............................... 192/85 R, 85 C, 192/85 CA, 115; 248/27.1, 27.3, 222.51; 92/128, 161; 403/326, 329

[56] References Cited

U.S. PATENT DOCUMENTS

| | | | |
|---|---|---|---|
| 3,858,988 | 1/1975 | Cohen | 403/329 X |
| 4,488,701 | 12/1984 | Leigh-Monstevens | 248/637 |
| 4,516,748 | 5/1985 | Nix et al. | 192/115 X |
| 4,640,478 | 2/1987 | Leigh-Monstevens | 248/27.1 |
| 4,658,660 | 4/1987 | Parker | 248/27.1 X |
| 4,798,129 | 1/1989 | Straub, Jr. | 403/326 X |
| 4,826,121 | 5/1989 | Rossigno et al. | 248/27.3 X |
| 5,810,145 | 9/1998 | Thomire | 192/115 X |

*Primary Examiner*—Richard M. Lorence
*Attorney, Agent, or Firm*—Nils H. Ljungman & Associates

[57] ABSTRACT

A quick fastener for mounting a hydraulic cylinder to a casing, whereby the hydraulic cylinder has a fastening device, and the casing has mounting structures in the casing wall. The mounting structures act in concert with the fastening device so that the hydraulic cylinder can be mounted to the casing wall without using tools. The fastening device includes primarily a fastening nose and a catch spring with a catch nose, as well as, a stop collar or groove. The mounting structures include at least one opening in the casing wall that have contours into which the fastening nose as well as the catch spring with the catch nose can be inserted. The advantage of this quick fastener lies in the simple sealing of the chambers on both sides of the casing wall, with a simple assembly, by inserting, in the direction of the axle of the hydraulic cylinder, and the swinging or positioning, as desired, of the hydraulic cylinder into the mounting position. The quick fastener can also be secured, also manageable without tools, by supporting the catch spring through appropriate securing elements.

20 Claims, 3 Drawing Sheets

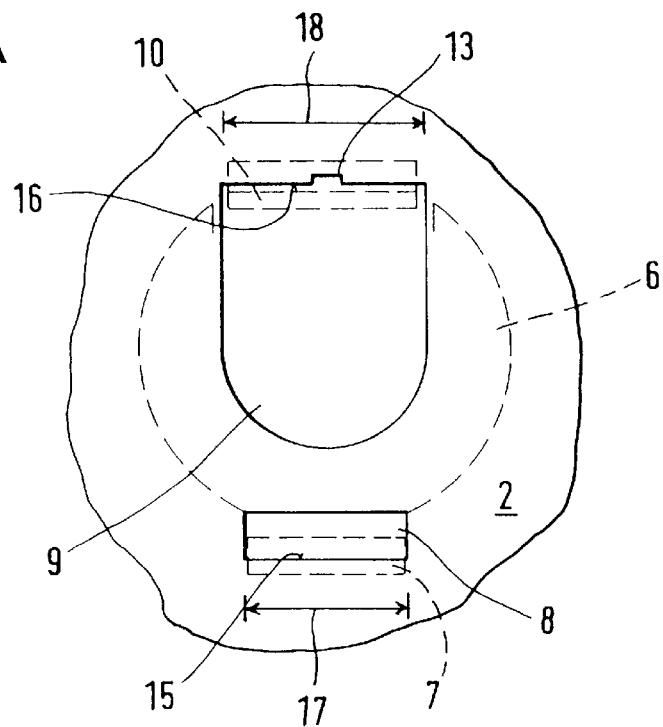
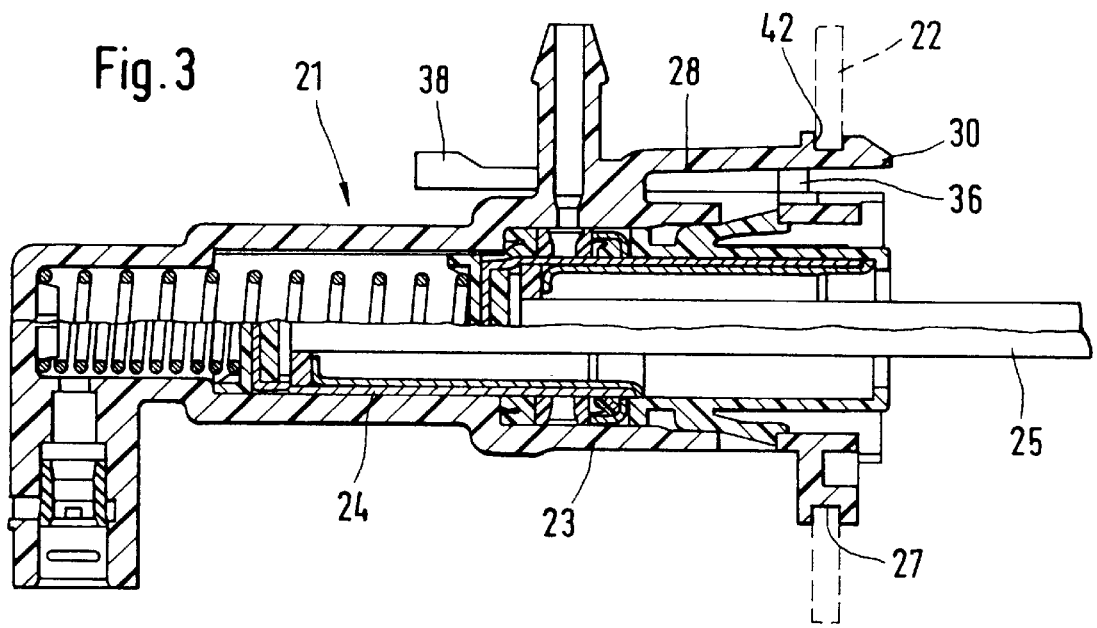

MOTOR VEHICLE AN HYDRAULIC CYLINDER, SUCH AS TO ACTUATE A CLUTCH, HAVING A QUICK FASTENER FOR MOUNTING THE HYDRAULIC CYLINDER TO A HOUSING

BACKGROUND OF THE INVENTION

1. Field of the Invention

The present invention relates to a quick fastener for mounting a pressure means cylinder to a casing, including a pressure means cylinder with a cylinder casing, a piston, and a tappet with a fastening device for fastening the pressure means cylinder to a casing or housing wall, essentially without tools. Whereby, the casing wall shows mounting structures into which the pressure means cylinder can be inserted.

2. Background Information

U.S. Pat. No. 4,640,478 discloses a mounting structure for attaching a pressure means cylinder to a casing, consisting of a bayonet fastener with a back cut, whereby over the spring force of an auxiliary spring, the pressure means cylinder is held in its position. For this reason, the pressure means cylinder shows division ribs or lugs that run on the circumference which can be inserted into recesses of projections that are placed in the casing wall and which must be designed therein a prominent manner. The assembly is executed by simple movements that are possible to perform without tools, namely by pushing the pressure means cylinder into the casing wall to a stop, followed by an approximately 45° turn, and finally by inserting the auxiliary spring for fastening the pressure means cylinder with its circumferential wedge ribs or lugs into the notches in the bayonet fastener provided on the casing wall.

Although it is relatively easy to build the pressure means cylinder with its partially circumferential ribs, the fastening process in the casing wall, however, requires more effort because a mounting plate must be constructed that connects to the casing wall. This mounting plate shows the accommodation structures of the bayonet fastener, and has to be built separately.

U.S. Pat. No. 4,488,701 discloses another way of fastening a pressure means cylinder to a casing wall without tools. With the mounting of the pressure means cylinder in the casing wall, a bayonet fastener is closed by a 45° turn of the pressure means cylinder. A ring seal keeps, through its tension, the bayonet fastener in a no-play state, and an auxiliary spring secures the connection by hooking into a notch device so that the pressure means cylinder will not turn back or fall out of the casing wall. It is not always possible to turn pressure means cylinders in the assembled state by 45°, especially in the narrowly calculated spaces of automobiles, and especially when attaching parts are placed on the pressure means cylinder perpendicular to its axle.

OBJECT OF THE INVENTION

Therefore, the object of the present invention is to create a quick fastener for mounting a pressure means cylinder to a casing, which quick fastener can be operated and released by hand, whereby no rotary motions are necessary, and whereby the chambers on the cylinder side and on the other side of the casing wall are sealable.

SUMMARY OF THE INVENTION

The present invention teaches that this object can be accomplished by means of a fastening device that comprises a stop collar, a fastening nose, and a catch spring with a catch nose. Whereby, the fastening device can be connected, by hand, to the mounting structures, having at least one opening with contours.

The pressure means cylinder can be mounted to the casing wall by hanging, or engaging, the fastening nose into the first contour of the opening and by swinging the entire pressure means cylinder in against the stop collar after clicking the catch nose of the catch spring behind the second contour of the opening in the casing wall. The chambers on both sides of the casing wall can be sealed, after mounting the pressure means cylinder to the casing wall, by a rubber cap which lies around the mounting structures, and against the casing wall, or by a sealing element which is integrated into the mounting structure.

The catch spring can be, after the catch nose clicks, supported by the sealing element and can be secured against the catch nose bending away from the second contour of the casing wall. The stop collar can lie against the casing wall in the mounted position and seals, in connection with the sealing element, the two chambers on this side and on the other side of the casing wall from one another.

In another preferred embodiment, there can be a fastening device for fastening a pressure means cylinder to a casing wall, essentially without tools, whereby the casing wall shows mounting structures into which the pressure means cylinder can be inserted. The fastening device consists of a fastening groove and a catch spring with a catch nose, whereby this fastening device can be connected, by hand, to the mounting structures. The mounting structures having at least one opening with contours. The pressure means cylinder can be mounted to the casing wall by hanging the fastening groove into the first contour of the opening and by swinging the entire pressure means cylinder in as far as a stop rib, which stop rib lies against the casing wall after clicking the catch nose behind the second contour of the opening of the casing wall.

The catch spring can be, after the catch nose clicks, supported by at least one locking nose, and can be secured against the catch nose bending away from the second contour of the casing wall.

A first locking nose and a second locking nose, in their locking positions, can be engaged and disengaged, by hand, from a position underneath the catch spring. The first locking nose can be placed at one of the ends of a first securing shackle, which first securing shackle is connected over a first center of motion, to the cylinder casing of the pressure means cylinder, and shows at the other end a first operating lever. The second locking nose can be placed at one of the ends of a second securing shackle, which second securing shackle is connected, over a second center of motion, to the cylinder casing of the pressure means cylinder, and shows at the other end a second operating lever. The locking noses, through spring force, are held in the locking position underneath the catch spring and can be swung out, against one another, from the locking position by actuating the operating levers.

The pressure means cylinder can be made of plastic and built in one piece with the fastening device and the securing shackles. The first contour can have a first length and the second contour can have a second length, whereby the first length can be clearly different from the second length.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to particular preferred embodiments of a quick fastener for mounting a pressure means cylinder to a casing which are illustrated in the accompanying drawings, wherein:

FIG. 2A shows the casing wall of FIG. 2, with additional features labelled;

FIG. 3 shows a pressure means cylinder with a fastening device, pursuant to FIG. 1, and additional security in the form of locking noses underneath the catch spring;

DESCRIPTION OF THE PREFERRED EMBODIMENT

Figure 1:
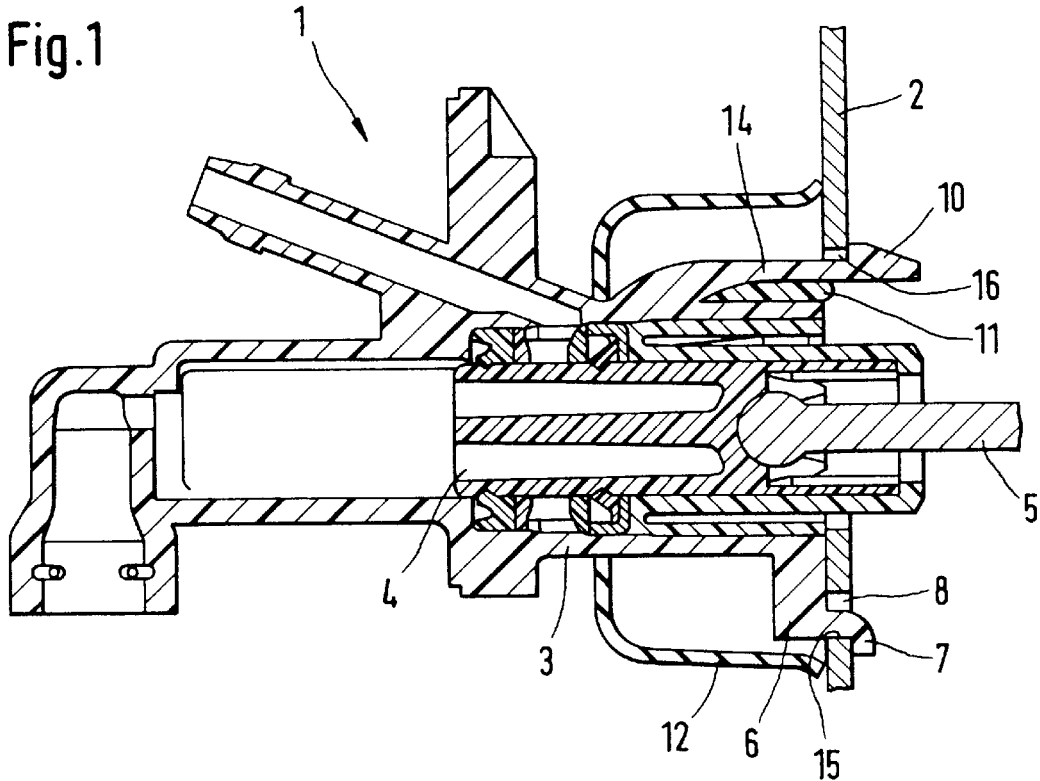
FIG. 1 shows a pressure means cylinder, in the mounted position, on a casing wall with a fastening nose and a catch spring with a rubber cap as sealing.

FIG. 1 indicates a pressure means cylinder 1, or hydraulic cylinder, comprising a cylinder casing 3, a piston 4, and a tappet 5 that is connected to this piston 4. The pressure means cylinder 1 is mounted to a casing wall 2, whereby on one side of the casing wall 2 the hydraulic part in the form of the pressure means cylinder 1 with its connections is located, and on the other side of the casing wall 2 the mechanical part, not illustrated here, following the tappet 5 is located. Pursuant to FIG. 1, it is illustrated as to how the pressure means cylinder 1 is connectable by hand to the casing wall 2 without using tools, namely by a fastening device on the pressure means cylinder 1. The fastening device can include a stop collar 6 with a fastening nose 7 as well as a catch spring 14 with a catch nose 10, whereby the fastening nose 7 and the catch nose 10 can be fastened, in mounting structures of the casing wall 2, to the casing wall 2. In this embodiment, the mounting structures have a first opening 8 with a first contour 15 and a second opening 9 with a second contour 16 (see FIG. 2). The first opening 8 is just big enough for the fastening nose 7 to be pushed through and hung into the first contour 15. In this embodiment, the second opening 9 is designed bigger in order to pass parts of the cylinder casing 3 through the casing wall 2, and to connect the catch nose 10 with the second contour 16.

To further explain, in at least one possible embodiment of the present invention, the pressure means cylinder 1 may comprise an hydraulic cylinder to actuate an automobile clutch or brake, which hydraulic cylinder 1 is connectable, by hand, to a casing or housing wall 2, which casing wall 2 may, for example, comprise the fire wall of an automobile. On the opposite side of this casing wall or fire wall 2 from the hydraulic cylinder 1 would be the mechanical parts of an automobile clutch or brake, including, for example, a clutch pedal or a brake pedal.

Figure 2:
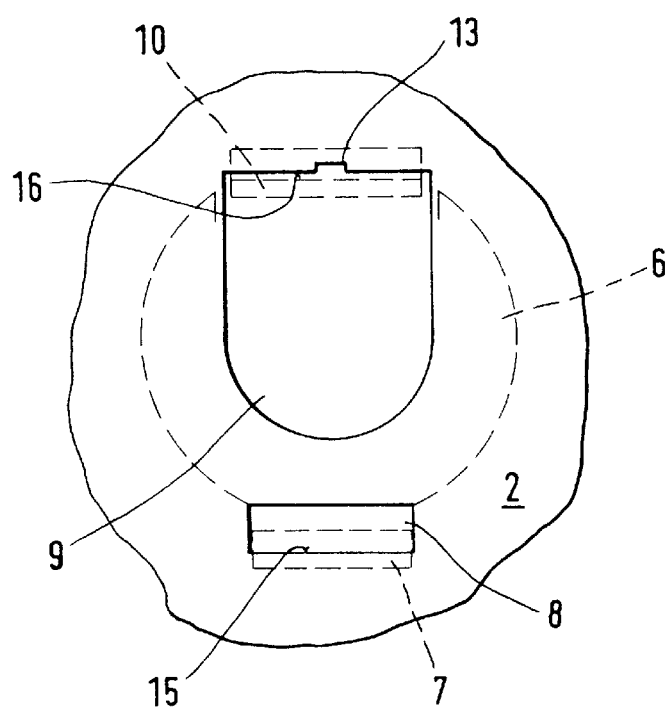
FIG. 2 shows the casing wall with two openings and contours for fastening the fastening nose and the catch nose.

As shown in FIG. 2, the fastening nose 7 reaches over the first contour 15 in the first opening 8 and the catch nose 10 reaches over the second contour 16 in the second opening 9 in such a way that, through the spring force of the catch spring 14, holding forces are generated for the pressure means cylinder 1 in the casing wall 2.

In most cases it is necessary to seal the two chambers on the cylinder side and on the other side of the casing wall 2 against one another. One way this sealing action can take place is by placing the stop collar 6 against the casing wall 2, whereby only a sealing element 11 must seal the area around the catch nose 10. Another version of this sealing action is realized, pursuant to FIG. 1, by a rubber cap 12 which is placed around the cylinder casing 3 and bumps, with a rim of a pot-type design, against the casing wall 2, whereby this rim encloses the mounting structures. The sealing element 11 can be designed as a rubber form component and be placed, after mounting the pressure means cylinder 1 in the casing wall 2, between the catch spring 14 and the cylinder casing 3. As a result, the catch spring 14 is prevented from springing-in and thus the catch nose 10 is prevented from bending away from the second contour 16. Consequently, the sealing element 11 serves, in addition to its purpose of sealing the two chambers on both sides of the casing wall 2, also in securing the catch spring 14, after mounting the pressure means cylinder 1 in the casing wall 2.

Disassembling the pressure means cylinder 1 essentially takes place without using tools by bending the catch nose 10 away from the second contour 16 of the casing wall 2, after the sealing element 11, as a security, has been removed from underneath the catch spring 14. The pressure means cylinder 1 can now be released from the casing wall 2 by swinging the catch spring 14 out of its connection, whereby the pressure means cylinder 1 must describe only a small swinging angle. If angleling-off is not possible, then the catch spring 14 must be able to spring in by a larger amount, namely that of the height of the fastening nose 7.

To further explain, in one possible embodiment of the present invention, disassembling the pressure means cylinder 1 from the casing wall 2 can essentially also take place without the use of tools by removing the sealing element 11 from underneath the catch spring 14, and manually bending the catch nose 10 away from the second contour 16 of the casing wall 2. The pressure means cylinder 1 can then be released from the casing wall 2 by swinging the catch spring 14 out of its connection by moving the pressure means cylinder 1 a small swinging angle, and thereby also permitting the disengaging of the fastening nose 7 from the first contour 15, and the removal of the fastening nose 7 from the first opening 8 in the casing wall 2. However, if due to space restrictions it is not possible to angle-off the pressure means cylinder 1, after the securing element 11 has been removed and the catch spring has been released, then the catch spring 14 can compensate by being configured to spring inwardly over a larger distance. This distance being sufficient to both release the catch nose 10 from the second contour 16, as well as allow the sufficient shifting of the pressure means cylinder 1 away from the first contour 15, to thereby disengage the fastening nose 7 from the first contour 15, essentially without the need for angling the pressure means cylinder 1.

If disassembling is to be made easier, a mounting aid 13 in the form of a recess in the second contour 16 is possible. This can be visible after bending the catch nose 10 slightly away from the second contour 16, and it is possible, with the aid of a screwdriver or another appropriate tool, to have the catch nose 10 bend away by levering off. The mounting aid 13 can also be designed in such a way that with the catch nose 10 engaged in the second contour 16, a small part of the mounting aid 13 is still visible, as a result of which a tool can be inserted without bending the catch nose 10 beforehand.

Figure 5:
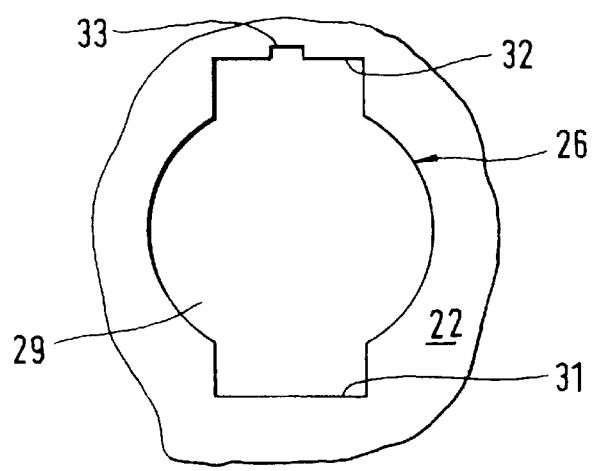
FIG. 5 shows the casing wall with mounting structures, having an opening with contours.

In FIG. 3 a second variation of a pressure means cylinder 21 is illustrated, including a cylinder casing 23, a piston 24, and a tappet 25. The cylinder casing 23 has a fastening device with a fastening groove 27 on a casing extension and a catch spring 28 with a catch nose 30. With this mounting device, the pressure means cylinder 21 can be mounted in a casing wall 22 which shows mounting structures pursuant to FIG. 5. The mounting structures including an opening 29 with a first contour 31, a second contour 32, and a mounting aid 33. The catch spring 28 has, in addition to the catch nose 30, in clearance to the casing wall 22, a stop rib 42 which, in the case of mounting the pressure means cylinder 21 to the casing wall 22, knocks against the casing wall, and in this way sets the position of the pressure means cylinder 21 in reference to the casing wall 22. The first contour 31 and the second contour 32 lie parallel to each other and enable a swinging-in of the fastening device of the pressure means cylinder 21, after inserting the fastening groove 27 into the first contour 31, until the catch nose 30 clicks into the second contour 32, after the stop rib 42 stops against the casing wall 22. The pressure means cylinder 21 has at its mounting end a fitting diameter 26 which can be found, for tightness reasons, in the contour of the opening 29.

Figure 5A:
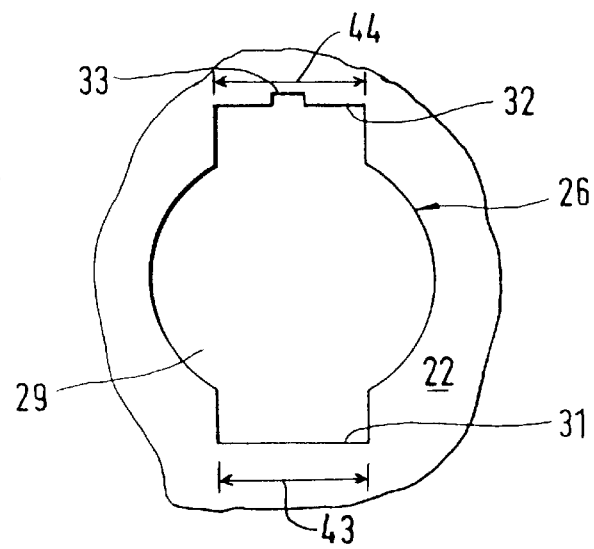
FIG. 5A is similar to FIG. 5, showing the casing wall with mounting structures having an opening with contours.

Mounting the pressure means cylinder 1 to the casing wall 2 (FIGS. 1 & 2) can only be possible in one single position, that is why the accommodation contours, consisting of the first opening 8 and the second opening 9, are designed in such a way that the fastening nose 7 can only be joined with the first opening 8 and the catch spring 14 can only be joined with the second opening 9. For this reason, the first contour has a first length 17 and the second contour 16 has a second length 18 (see FIG. 2A), whereby the first length 17 corresponds with the width of the fastening nose 7 and the second length 18 corresponds with the width of the catch spring 14. Analogous to this, incorrect mounting of the pressure means cylinder 21 (see FIG. 5A) into the mounting structures of the casing wall 22 can be ruled out in that the first contour 31 has a first length 43 and the second contour 32 has a second length 44, whereby the first length 43 can be clearly different from the second length 44. The first length 43 corresponds to the width of the fastening groove 27 and the second length 44 corresponds to the width of the catch spring 28.

Figure 4:
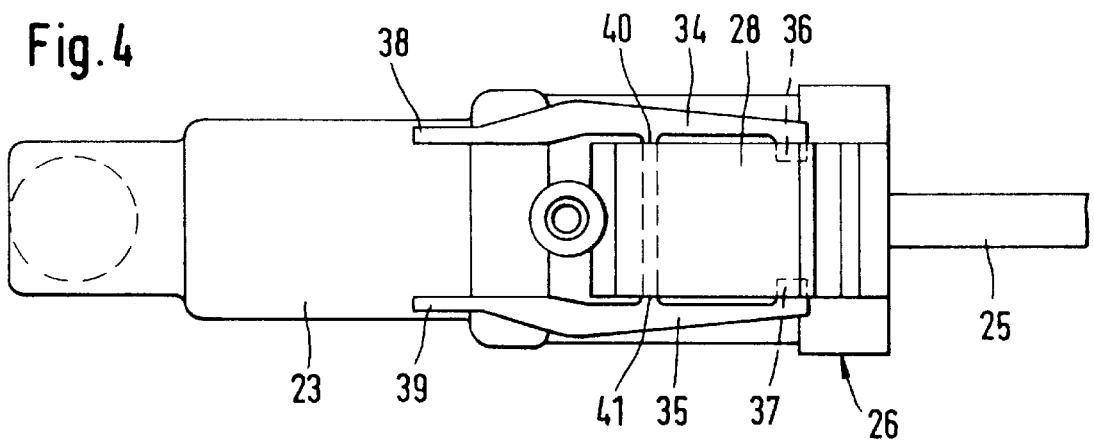
FIG. 4 shows the locking noses on mounting shackles to be operated by hand.

In FIG. 4 a securing device is illustrated which becomes active after the pressure means cylinder 21 is anchored in the casing wall 22. The securing device includes a first securing shackle 34 and a second securing shackle 35 which is placed vis-a-vis in mirror image to the center plane of the pressure means cylinder 21, whereby the first securing shackle 34 has a first locking nose 36, a first operating lever 38, and a first center of motion 40, while the second securing shackle 35 has a second locking nose 37, a second operating lever 39, and a second center of motion 41. The securing shackles 34 and 35 are connected to the cylinder casing 23 over the centers of motion 40 and 41 and can be moved through a reversed actuation of the operating levers 38 and 39 in such a way that the locking noses 36, 37, which are pushed, through spring force, between the catch spring 28 and the cylinder casing 23, can be released from their locking position, as a result of which the catch spring 28 and thus the catch nose 30 can be bent away from the second contour 32. The locking noses 36 and 37 can be formed slightly conical so that, in the mounting position pursuant to FIG. 4, additional tension force arises for the catch spring 28 against the second contour 32. As a result of which, a counteracting force is generated in the connection of the placement of the fastening groove 27 against the first contour 31. The advantage of such a security feature is to have the opportunity to release, by simple means without using tools, pressure means cylinders 21 from their anchorage, even after a longer period of time.

To further explain, in at least one possible embodiment of the present invention, a securing device can be active after the pressure means cylinder 21 is anchored in the casing wall 22. This device can comprise two securing shackles 34, 35 which are placed facing one another, in mirror image, on opposite sides of the center plane of the pressure means cylinder 21. The first securing shackle 34 has a first locking nose 36 at one end, a first operating lever 38 at the opposite end, and a center of motion or pivot point 40 located between its locking nose 36 and operating lever 38. Likewise, the second securing shackle 35 has a second locking nose 37, a second operating lever 39 opposite its locking nose 37, and a second center of motion or pivot point 41 located between its operating lever 39 and its locking nose 37. These securing shackles 34, 35 can be spring biased into a locking position in which the locking noses 36, 37, which can be slightly conical in shape, are biased between the catch spring 28 and the cylinder casing 23, to thereby aid in the securing of the mounting. These locking noses 36, 37 thereby providing additional tension force for the catch spring 28 against the second contour 32, as a result of which a counteracting force is also generated in the connection of the fastening groove 27 against the first contour 31, which can help secure this connection as well. The spring biasing of the locking noses 36, 37 can be an inherent biasing due to the nature of the material used and the initial positioning of the securing shackles 34, 35. Alternatively, this biasing can result by the use of one or more separate spring elements to bias the locking noses 36,37 inwardly. For example, a spring could be disposed so as to bias the operating levers 37, 38 outwardly, away from one another, and thus bias the locking noses 36, 37 toward one another.

In one embodiment, these securing shackles 34, 35 can be connected or united with the cylinder casing 23, over or at the centers of motions 40, 41, and can be moved through a reversed actuation of the operating levers 38, 39 in such a way that the locking noses 36, 37 of both shackles 34, 35 can be moved outward, and become disengaged from between the catch spring 28 and the cylinder casing 23 (such as, for example, by squeezing the ends of two operating levers toward one another). In one embodiment, a cross member can exist essentially connecting one securing shackle to another. This cross member can be part of, or connected to, the cylinder casing 23. After disengagement of the locking noses 36, 37 from between the catch spring 28 and the cylinder casing 23, the catch spring 28 and thus the catch nose 30 can be bent away from the second contour 32. The advantage of this type of security arrangement is to have the opportunity to release, by simple means, without the need for tools, pressure means cylinders 21 from their anchorages, even after long periods of attachment.

One feature of the invention resides broadly in the pressure means cylinder 1 with a cylinder casing 3, a piston 4, and a tappet 5 with a fastening device for fastening the pressure means cylinder 1 to a casing wall 2, essentially without tools, whereby the casing wall 2 shows mounting structures into which the pressure means cylinder 1 can be inserted, distinguished in that the fastening device consists of a stop collar 6, a fastening nose 7, and a catch spring 14 with a catch nose 10, whereby the fastening device can be connected, by hand, to the mounting structures, consisting of at least one opening 8, 9 with contours 15, 16.

Another feature of the invention resides broadly in the pressure means cylinder distinguished in that the pressure means cylinder 1 can be mounted to the casing wall 2 by hanging the fastening nose 7 into the first contour 15 of the opening 8 and by swinging the entire pressure means cylinder 1 in against the stop collar 6 after clicking the catch nose 10 behind the second contour 16 of the opening 9 into the casing wall 2.

Yet another feature of the invention resides broadly in the pressure means cylinder distinguished in that the chambers on this side and on the other side of the casing wall 2 be sealed, after mounting the pressure means cylinder 1 to the casing wall 2, by a rubber cap 12 which lies, around the mounting structures, against the casing wall 2 or by a sealing element 11 which is integrated into the mounting structure.

Still another feature of the invention resides broadly in the pressure means cylinder distinguished in that the catch spring 14 is, after the catch nose 10 clicks, supported by the sealing element 11 and is secured against the catch nose 10 bending away from the second contour 16 of the casing wall 2.

A further feature of the invention resides broadly in the pressure means cylinder distinguished in that the stop collar 6 lies against the casing wall 2 in the mounted position and seals, in connection with the sealing element 11, the two chambers on this side and on the other side of the casing wall 2 from one another.

Another feature of the invention resides broadly in the pressure means cylinder 21 with a cylinder casing 23, a piston 24, and a tappet 55 with a fastening device for fastening the pressure means cylinder 21 to a casing wall 22, essentially without tools, whereby the casing wall 22 shows mounting structures into which the pressure means cylinder 21 can be inserted, distinguished in that the fastening device consists of a fastening groove 27 and a catch spring 28 with a catch nose 30, whereby this fastening device can be connected, by hand, to the mounting structures, consisting of at least one opening 29 with contours 31, 32.

Yet another feature of the invention resides broadly in the pressure means cylinder distinguished in that the pressure means cylinder 21 can be mounted to the casing wall 22 by hanging the fastening groove 27 into the first contour 30 of the opening 29 and by swinging the entire pressure means cylinder 21 in as far as a stop rib 42 lies against the casing wall 22, after clicking the catch nose 30 behind the second contour 32 of the opening 29 of the casing wall 22.

Still another feature of the invention resides broadly in the pressure means cylinder distinguished in that the catch spring 28 is, after the catch nose 30 clicks, supported by at least one locking nose 36, 37 and is secured against the catch nose 30 bending away from the second contour 32 of the casing wall 22.

A further feature of the invention resides broadly in the pressure means cylinder distinguished in that the first locking nose 36 and the second locking nose 37, in their locking positions, can be engaged and disengaged, by hand, from underneath the catch spring 28.

Another feature of the invention resides broadly in the pressure means cylinder distinguished in that the first locking nose 36 is placed at one of the ends of a first securing shackle 34 which is connected, over a first center of motion 40, to the cylinder casing 23 of the pressure means cylinder 21 and shows at the other end a first operating lever 38, and that the second locking nose 37 is placed at one of the ends of a second securing shackle 35 which is connected, over a second center of motion 41, to the cylinder casing 23 of the pressure means cylinder 21 and shows at the other end a second operating lever 39, whereby the locking noses 36, 37, through spring force, are held in the locking position underneath the catch spring 28 and can be swung out, against one another, from the locking position by actuating the operating levers 38 and 39.

Yet another feature of the invention resides broadly in the pressure means cylinder distinguished in that the pressure means cylinder 21 is made of plastic and built in one piece with the fastening device and the securing shackles 34 and 35.

Still another feature of the invention resides broadly in the pressure means cylinder distinguished in that the first contour 15, 31 shows a first length 17, 43 and the second contour 16, 32 shows a second length 18, 44, whereby the first length 17, 43 is clearly different from the second length 18, 44.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Examples of hydraulic piston assemblies, clutch and/or brake assemblies and/or components thereof, which could possibly be used with at least one embodiment of the present invention may be found in U.S. Pat. Nos.: 5,704,462, issued on Jan. 6, 1998 to W. Grosspietsch and A. Eusemann; 5,638,934, issued on Jun. 17, 1997 to A. Link and R. Weidinger; 5,655,634, issued on Aug. 12, 1997 to M. Grundei, et al.; 5,538,115, issued on Jul. 23, 1996 to K. Koch; and 5,454,455, issued on Oct. 3, 1995 to K. Kundmuller and W. Christel; and in U.S. Patent application Ser. No. 08/895,770, having inventor T. Riess, filed on Jul. 17, 1997.

Examples of hydraulic clutch actuators and/or components thereof, which could possibly be used with the present invention may be found in U.S. Pat. Nos.: 5,377,800, issued on Jan. 3, 1995 to D. Sperduti, et al.; 5,390,497, issued on Feb. 21, 1995 to M. Cottam; 5,398,796, issued on Mar. 21, 1995 to O. Doremus; 5,400,889 issued on Mar. 28, 1995 to D. Bell and M. Walker; 5,407,042, issued on Apr. 18, 1995 to T. Fukui, et al.; 5,425,238, issued on Jun. 20, 1995 to I. Takagi; and 5,445,257, issued on Aug. 29, 1995 to T. Grabis.

Examples of hydraulic brake actuators and/or components thereof, which could possibly be used with the present invention may be found in U.S. Pat. Nos.: 5,388,669, issued on Feb. 14, 1997 to E. Holl, et al.; 5,411,120, issued on May 2, 1995 to R. Null; 5,413,197, issued on May 9, 1995 to L. Baer and W. Pyndus; 5,447,364, issued on Sep. 5, 1995 to D. Appelgren; 5,452,779, issued on Sep. 26, 1995 to T. Gee; 5,461,565, issued on Oct. 24, 1995 to S. Sakane, et al.; and 5,464,078, issued on Nov. 7, 1995 to J. Pittman.

Examples of spring fasteners or attachments can be found in U.S. Pat. Nos.: 5,392,196, issued on Feb. 21, 1995 to J.

Kinner; 5,419,019, issued on May 30, 1995 to K. Ida; 5,451,019, issued on Sep. 19, 1995 to R. Pittman; 5,383,716, issued on Jan. 24, 1995 to J. Stewart and C. Phillips; and 5,379,716 issued on Jan. 10, 1995 to E. Helland.

All of the patents, patent applications and publications recited herein, are hereby incorporated by reference as if set forth in their entirety herein.

The corresponding foreign patent publication applications, namely, Federal Republic of Germany Patent Application No. 197 10 631.5, filed on Mar. 14, 1997, having inventors Ulrich Teichert and Manfred Mischler, and DE-OS 197 10 631.5 and DE-PS 197 10 631.5, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A motor vehicle hydraulic cylinder for being attached to a wall member of a motor vehicle; the wall member comprising at least one mounting structure comprising at least one hole, a first contour, and a second contour; and into which at least one hole a portion of the hydraulic cylinder can be inserted; said hydraulic cylinder comprising:
   a cylinder casing defining a chamber;
   a piston disposed in said chamber;
   a rod member operatively connected to said piston to move with said piston;
   a fastening arrangement to permit the substantially manual fastening of said hydraulic cylinder to at least one mounting structure of a wall member of a motor vehicle;
   said fastening arrangement comprising:
      a fastening groove being configured to engage with a first contour of the at least one mounting structure of the wall member;
      a catch spring comprising a catch nose being configured to engage with a second contour of the at least one mounting structure of the wall member;
   said hydraulic cylinder having a mounted position upon both the engagement of said fastening groove with the first contour of the at least one mounting structure of the wall member, and the engagement of said catch nose with the second contour of the at least one mounting structure of the wall member; and
   said fastening groove being configured to permit, upon engagement of said fastening groove with the first contour of at least one mounting structure, the pivoting of said hydraulic cylinder into the mounted position.

2. The hydraulic cylinder according to claim 1, wherein:
   said fastening groove comprises a stop rib configured to limit the depth of insertion of said hydraulic cylinder into the at least one hole;
   said stop rib is configured to be positioned essentially in contact with the wall member upon said hydraulic cylinder being in the mounted position; and
   said catch nose is configured to be snapped into place with the second contour of the wall member upon said hydraulic cylinder being in the mounted position.

3. The hydraulic cylinder according to claim 2, wherein:
   said hydraulic cylinder further comprises at least one locking nose;
   said at least one locking nose having a locking position;
   the locking position permitting said at least one locking nose to support said catch spring upon said hydraulic cylinder being in the mounted position; and
   the locking position permitting said at least one locking nose to substantially limit said catch nose from bending away from the second contour of the at least one mounting structure upon said hydraulic cylinder being in the mounted position.

4. The hydraulic cylinder according to claim 3, wherein said hydraulic cylinder comprises apparatus to manually engage and disengage said at least one locking nose into the locking position.

5. The hydraulic cylinder according to claim 4, wherein:
   said at least one locking nose comprises a first locking nose and a second locking nose;
   said apparatus to manually engage and disengage said at least one locking nose comprises:
      said first locking nose being disposed at a first end of a first securing shackle;
      said first securing shackle having a first lever disposed on a second end of said first securing shackle;
      said first securing shackle being connected to said cylinder casing over a first center of motion;
      said second locking nose being disposed at a first end of a second securing shackle;
      said second securing shackle having a second lever disposed on a second end of said second securing shackle;
   said second securing shackle being connected to said cylinder casing over a second center of motion;
   said first and second locking noses being configured to be biased into the locking position;
   the locking position having said first and second locking noses being substantially disposed between said catch spring and said cylinder casing; and
   said first and second locking noses being configured to move out from between said cylinder casing and said catch spring, into an unlocking position, upon actuation of said first and second levers.

6. The hydraulic cylinder according to claim 5, wherein:
   said hydraulic cylinder comprises a plastic material; and
   said hydraulic cylinder is configured as only one structure comprising said fastening device and said first and second securing shackles;
   the first contour and second contour each have a respective length;
   said fastening groove has a first length corresponding to the length of the first contour of the at least one mounting structure;
   said catch spring has a second length corresponding to the length of the second contour of the at least one mounting structure; and
   the first length being substantially different from the second length.

7. A motor vehicle hydraulic cylinder, for being attached to a wall member of a motor vehicle; the wall member comprising at least one mounting structure comprising at least one hole, a first contour, and a second contour; and into which at least one hole a portion of the hydraulic cylinder can be inserted; said hydraulic cylinder comprising:

a cylinder casing defining a chamber;

a piston disposed in said chamber;

a rod member operatively connected to said piston to move with said piston;

a fastening arrangement to permit the substantially manual fastening of said hydraulic cylinder to at least one mounting structure of a wall member of a motor vehicle;

said fastening arrangement comprising:

a fastening nose being configured to engage with a first contour of the at least one mounting structure of the wall member;

a catch spring comprising a catch nose being configured to engage with a second contour of the at least one mounting structure of the wall member;

said fastening arrangement comprising a stop collar;

said stop collar being disposed on said cylinder casing;

said stop collar being configured to limit the depth of insertion of said hydraulic cylinder into the at least one hole of the at least one mounting structure;

said hydraulic cylinder having a mounted position upon both the engagement of said fastening nose with the first contour of the at least one mounting structure of the wall member, and the engagement of said catch nose with the second contour of the at least one mounting structure of the wall member;

said fastening nose being configured to permit, upon engagement of said fastening nose with a first contour of at least one mounting structure, the pivoting of said hydraulic cylinder into the mounted position;

said catch nose being configured to be snapped into place with the wall member upon said hydraulic cylinder being in the mounted position; and said stop collar being configured to be positioned essentially in contact with the wall member upon said hydraulic cylinder being in the mounted position.

8. The hydraulic cylinder according to claim 7, wherein the wall member of the motor vehicle is disposed to divide a first chamber from a second chamber, said hydraulic cylinder comprises:

at least one rubber seal being configured and disposed to seal the first chamber from the second chamber;

said at least one rubber seal is at least one of:

a substantially cup-shaped seal disposed about said fastening apparatus, said substantially cup-shaped seal being configured to be disposed against the wall element upon said hydraulic cylinder being in the mounted position; and a sealing element being substantially disposed in and integral with said fastening apparatus.

9. The hydraulic cylinder according to claim 8, wherein:

said at least one rubber seal comprises said sealing element;

said sealing element being configured and disposed to support said catch spring upon said hydraulic cylinder being in the mounted position;

said sealing element being configured and disposed to support said catch spring and to substantially limit said catch nose from bending away from the second contour of the wall element upon said hydraulic cylinder being in the mounted position; and said stop collar being configured to be disposed to seal, in combination with said sealing element, the first chamber from the second chamber upon said hydraulic cylinder being in the mounted position.

10. A motor vehicle hydraulic cylinder for being attached to a wall member of a motor vehicle; the wall member comprising at least one mounting structure comprising at least one hole, a first contour, and a second contour; and into which at least one hole a portion of the hydraulic cylinder can be inserted; said hydraulic cylinder comprising:

a cylinder casing defining a chamber;

a piston disposed in said chamber;

a rod member operatively connected to said piston to move with said piston;

a fastening arrangement to permit the substantially manual fastening of said hydraulic cylinder to at least one mounting structure of a wall member of a motor vehicle;

said fastening arrangement comprising:

a fastening structure being configured to engage with a first contour of the at least one mounting structure of the wall member; and a catch spring comprising a catch nose being configured to engage with a second contour of the at least one mounting structure of the wall member;

said hydraulic cylinder having a longitudinal axis; and said catch nose being configured to flex in a direction substantially perpendicular to the longitudinal axis, upon the fastening of said hydraulic cylinder to the at least one mounting structure.

11. The hydraulic cylinder according to claim 10, wherein said fastening structure comprises a groove.

12. The hydraulic cylinder according to claim 11 wherein:

said hydraulic cylinder has a mounted position upon both the full engagement of said fastening nose with the first contour of the at least one mounting structure of the wall member, and the full engagement of said catch nose with the second contour of the at least one mounting structure of the wall member;

said fastening nose is configured to permit, upon engagement of said groove with the first contour of at least one mounting structure, the pivoting of said hydraulic cylinder into the mounted position.

13. The hydraulic cylinder according to claim 12, wherein:

said fastening nose comprises a stop rib configured to limit the depth of insertion of said hydraulic cylinder into the at least one hole of the at least one mounting structure;

said stop rib is configured to be positioned essentially in contact with the wall member upon said hydraulic cylinder being in the mounted position; and said catch nose being configured to be snapped into place with the second contour of the wall member upon said hydraulic cylinder being in the mounted position.

14. The hydraulic cylinder according to claim 13, wherein:

said hydraulic cylinder further comprises at least one locking nose;

said at least one locking nose has a locking position;

the locking position permitting said at least one locking nose to support said catch spring upon said hydraulic cylinder being in the mounted position; and the locking position permitting said at least one locking nose to substantially limit said catch nose from bending away from the second contour of the at least one mounting structure upon said hydraulic cylinder being in the mounted position.

15. The hydraulic cylinder according to claim 14, wherein said hydraulic cylinder comprises apparatus for manually engaging and disengaging said at least one locking nose into the locking position.

16. The hydraulic cylinder according to claim 15, wherein:
   said at least one locking nose comprises a first locking nose and a second locking nose;
   said apparatus for manually engaging and disengaging said at least one locking nose comprises:
      said first locking nose being disposed at a first end of a first securing shackle;
      said first securing shackle having a first lever disposed on a second end of said first securing shackle;
      said first securing shackle being connected to said cylinder casing over a first center of motion;
      said second locking nose being disposed at a first end of a second securing shackle;
      said second securing shackle having a second lever disposed on a second end of said second securing shackle;
      said second securing shackle being connected to said cylinder casing over a second center of motion;
   said first and second locking noses being biased into the locking position;
   the locking position comprising said first and second locking noses being substantially disposed between said catch spring and said cylinder casing;
   said first and second locking noses being configured to move out from between said cylinder casing and said catch spring, into an unlocking position, upon actuation of said first and second levers;
   said hydraulic cylinder comprises a plastic material;
   said hydraulic cylinder is configured as only one structure comprising said fastening device and said securing shackles;
   said first contour and said second contour each have a respective length;
   said fastening groove has a first length corresponding to the length of the first contour of the at least one mounting structure;
   said catch spring has a second length corresponding to the length of the second contour of the at least one mounting structure; and
   the first length being substantially different from the second length.

17. The hydraulic cylinder according to claim 10, wherein:
   said fastening structure comprises a fastening nose;
   said fastening arrangement comprises a stop collar;
   said stop collar being disposed on said cylinder casing; and
   said stop collar being configured to limit the depth of insertion of said hydraulic cylinder into the at least one hole of the at least one mounting structure.

18. The hydraulic cylinder according to claim 17, wherein:
   said hydraulic cylinder has a mounted position upon both the engagement of said fastening nose with the first contour of the at least one mounting structure of the wall member, and the engagement of said catch nose with the second contour of the at least one mounting structure of the wall member;
   said fastening nose is configured to permit, upon engagement of said fastening nose with a first contour of at least one mounting structure, the pivoting of said hydraulic cylinder into the mounted position;
   said catch nose is configured to be snapped into place with the wall member upon said hydraulic cylinder being in the mounted position; and
   said stop collar is configured to be positioned essentially in contact with the wall member upon said hydraulic cylinder being in the mounted-position.

19. The hydraulic cylinder according to claim 18, wherein the wall member of the motor vehicle is disposed to divide a first chamber from a second chamber, said hydraulic cylinder comprises:
   at least one rubber seal being configured and disposed to seal the first chamber from the second chamber;
   said at least one rubber seal is at least one of:
      a substantially cup-shaped seal disposed about said fastening apparatus, said substantially cup-shaped seal being configured to be disposed against the wall element upon said hydraulic cylinder being in the mounted position; and
      a sealing element being substantially disposed in and integral with said fastening apparatus.

20. The hydraulic cylinder according to claim 19, wherein:
   said at least one rubber seal comprises said sealing element;
   said sealing element is configured and disposed to support said catch spring upon said hydraulic cylinder being in the mounted position;
   said sealing element is configured and disposed to support said catch spring and to substantially limit said catch nose from bending away from the second contour of the wall element upon said hydraulic cylinder being in the mounted position;
   said stop collar being configured to be disposed to seal, in combination with said sealing element, the first chamber from the second chamber upon said hydraulic cylinder being in the mounted position.

* * * * *

UNITED STATES PATENT AND TRADEMARK OFFICE
CERTIFICATE OF CORRECTION

PATENT NO. : 6,000,516
DATED : December 14, 1999
INVENTOR(S) : Ulrich TEICHERT and Manfred MISCHLER It is certified that error appears in the above-indentified patent and that said Letters Patent is hereby corrected as shown below:

On the title page, item [54], in the first line of the title, before "MOTOR" insert --IN A--.

In column 1, line 1 of the title, before "MOTOR" insert --IN A--.

Signed and Sealed this

Ninth Day of January, 2001

Attest:

Q. TODD DICKINSON

*Attesting Officer*    *Commissioner of Patents and Trademarks*